United States Patent
Ho et al.

(10) Patent No.: US 9,549,358 B1
(45) Date of Patent: Jan. 17, 2017

(54) COVERAGE HOLE DETECTION APPARATUS AND METHOD

(71) Applicant: Institute For Information Industry, Taipei (TW)

(72) Inventors: Chih-Hsiang Ho, Taipei (TW); Yi-Chih Tung, Taipei (TW); Pang-Fu Liu, New Taipei (TW); Hao-Gen Wong, Taoyuan (TW); Li-Sheng Chen, Yilan (TW)

(73) Assignee: Institute For Information Industry, Taipei (TW)

( * ) Notice: Subject to any disclaimer, the term of this patent is extended or adjusted under 35 U.S.C. 154(b) by 0 days.

(21) Appl. No.: 14/961,828

(22) Filed: Dec. 7, 2015

(30) Foreign Application Priority Data

Nov. 20, 2015 (TW) .............................. 104138480 A (51) Int. Cl.
| | |
|---|---|
| H04W 36/00 | (2009.01) |
| H04W 36/32 | (2009.01) |
| H04W 64/00 | (2009.01) |
| H04L 12/26 | (2006.01) |
| H04W 36/08 | (2009.01) |
| H04W 36/30 | (2009.01) |
| H04B 17/318 | (2015.01) |

(52) U.S. Cl.
CPC ........... *H04W 36/32* (2013.01); *H04B 17/318* (2015.01); *H04L 43/0811* (2013.01); *H04W 36/08* (2013.01); *H04W 36/30* (2013.01); *H04W 64/00* (2013.01)

(58) Field of Classification Search
USPC .................. 455/432.1, 433, 435.2, 436–445,455/450–453, 456.1–456.3; 370/329, 330, 331, 370/333
See application file for complete search history.

(56) References Cited

U.S. PATENT DOCUMENTS

| | | | |
|---|---|---|---|
| 9,282,494 B2* | 3/2016 | Folke | H04W 36/08 |
| 2012/0088498 A1 | 4/2012 | Xiao et al. | |
| 2012/0088507 A1* | 4/2012 | Legg | H04W 36/245 455/436 |
| 2012/0127876 A1 | 5/2012 | Hunukumbure et al. | |
| 2016/0007216 A1* | 1/2016 | Chou | H04W 24/04 370/216 |
| 2016/0037408 A1* | 2/2016 | Xu | H04W 36/0033 370/331 |
| 2016/0037528 A1* | 2/2016 | Kim | H04L 5/001 370/329 |

(Continued)

*Primary Examiner* — Dai A Phuong
(74) *Attorney, Agent, or Firm* — Skaar Ulbrich Macari, P.A.

(57) ABSTRACT

A coverage hole detection apparatus and method are provided. The coverage hole detection apparatus decides two boundary locations of a coverage hole according to (a) a time length from a time point when a user equipment (UE) has detected a disconnection from a first base station to a time point when the UE determines that a Radio Link Failure (RLF) has happened, (b) a time length from a time point when the UE receives an RLF report request from a second base station to a time point when the UE transmits an RLF report response to the second base station, (c) a location that the UE determines that the RLF has happened, and (d) a location where the UE transmits the RLF report response. The coverage hole detection apparatus decides the coverage hole according to the two boundary locations and a sensitivity range of the UE.

12 Claims, 7 Drawing Sheets

(56) References Cited

U.S. PATENT DOCUMENTS

| | | | |
|---|---|---|---|
| 2016/0088516 A1* | 3/2016 | Radulescu | H04W 24/04 455/424 |
| 2016/0100341 A1* | 4/2016 | Wu | H04W 36/0083 455/436 |
| 2016/0165476 A1* | 6/2016 | Wang | H04W 24/10 455/404.1 |
| 2016/0174283 A1* | 6/2016 | Dalsgaard | H04W 48/16 455/435.2 |
| 2016/0205595 A1* | 7/2016 | Stewart | H04W 36/0083 455/436 |
| 2016/0242049 A1* | 8/2016 | Centonza | H04W 24/02 |

* cited by examiner

COVERAGE HOLE DETECTION APPARATUS AND METHOD

PRIORITY

This application claims priority to Taiwan Patent Application No. 104138480 filed on Nov. 20, 2015, which is hereby incorporated by reference in its entirety.

FIELD

The present invention relates to a coverage hole detection apparatus and method; more particularly, the present invention relates to a coverage hole detection apparatus and method that uses timing information and location information.

BACKGROUND

The wireless network communication technologies have experienced rapid development in recent years. To serve more users and to provide better communication quality, operators have to consider the integrity of base station deployment (e.g., whether the overall signal coverage of all base stations deployed has any coverage hole or whether mobile apparatuses will experience a poor received signal strength in some areas).

To overcome these problems, the operators used to make drive tests through use of many professionals to inspect the integrity of the base station coverage and then adjust the deployment of base stations (e.g., increase the number of base stations, adjust the antenna orientations of the base stations and etc.) according to the test results. However, making the drive tests by the professionals represents an overly high cost.

To reduce the cost of drive tests, the $3^{rd}$ Generation Partnership Project (3GPP) standard utilizes the Radio Link Failure (RLF) report mechanism. Specifically, mobile apparatuses used by consumers are considered as the tools for drive tests in 3GPP. If a mobile apparatus experiences an RLF during the moving process, RLF related information (e.g., a previous serving base station of the mobile apparatus, a neighboring base station of the serving base station, the location of the serving base station and etc.) is transmitted to a backhaul network to evaluate the integrity of the base station coverage. Nevertheless, the 3GPP does not specify how to determine whether there is any coverage hole in the signal coverage of the wireless network system, so there is still a need for a coverage hole detection mechanism.

SUMMARY

The disclosure includes a coverage hole detection apparatus, which comprises a transceiving interface and a processing unit electrically connected with the transceiving interface. The transceiver interface is configured to receive a first time length, a second time length, a piece of first location information, and a piece of second location information. The first time length is from a time point when a user equipment (UE) has detected a disconnection from a first base station to a time point when the UE determines that a Radio Link Failure (RLF) has happened. The second time length is from a time point when the UE receives an RLF report request from a second base station to a time point when the UE transmits an RLF report response to the second base station. The piece of first location information indicates a location where the UE determines that the RLF has happened. The piece of second location information indicates a location where the UE transmits the RLF report response. The processing unit is configured to calculate a first distance according to the first time length and a moving velocity, calculate a second distance according to the second time length and the moving velocity, decide a first boundary location of a coverage hole according to the piece of first location information and the first distance, decide a second boundary location according to the piece of second location information and the second distance, and decide the coverage hole according to the first boundary location, the second boundary location, and a sensitivity range of the UE.

The disclosure also includes a coverage hole detection method for use in an electronic apparatus. The coverage hole detection method comprises the following steps of: (a) receiving a first time length, a second time length, a piece of first location information, and a piece of second location information, wherein the first time length is from a time point when a UE has detected a disconnection from a first base station to a time point when the UE determines that an RLF has happened, the second time length is from a time point when the UE receives an RLF report request from a second base station to a time point when the UE transmits an RLF report response to the second base station, the piece of first location information indicates a location where the UE determines that the RLF has happened, and the piece of second location information indicates a location where the UE transmits the RLF report response, (b) calculating a first distance according to the first time length and a moving velocity, (c) calculating a second distance according to the second time length and the moving velocity, (d) deciding a first boundary location of a coverage hole according to the piece of first location information and the first distance, (e) deciding a second boundary location according to the piece of second location information and the second distance, and (f) deciding the coverage hole according to the first boundary location, the second boundary location, and a first sensitivity range of the UE.

In certain embodiments, a first time length (i.e., a time length from a time point when a UE has detected a disconnection from a first base station to a time point when the UE determines that an RLF has happened) and a piece of first location information (i.e., the location where the UE determines that the RLF has happened) are used to calculate a first boundary location (i.e., a location where the UE has detected the disconnection from the first base station). Furthermore, a second time length (i.e., a time length from a time point when the UE receives an RLF report request from a second base station to a time point when the UE transmits an RLF report response to the second base station) and a piece of second location information (i.e., a location where the UE transmits the RLF report response) are used to calculate a second boundary location (i.e., a location where the UE has just found the second base station through searching). Afterwards, a coverage hole is decided according to the first boundary location, the second boundary location, and a sensitivity range of the UE.

Since the first boundary location corresponds to the location where the UE has detected a disconnection from the first base station and the second boundary location corresponds to the location where the UE has just found the second base station through searching, the coverage hole decided according to these two boundary locations and the sensitivity range of the UE is surely an area where it is impossible or difficult for the UE to be served by a base station. Moreover, the present invention may further refer to time information and geographic information to decide the coverage hole more correctly.

The detailed technology and preferred embodiments implemented for the subject invention are described in the following paragraphs accompanying the appended drawings for people skilled in this field to well appreciate the features of the claimed invention.

DETAILED DESCRIPTION

In the following description, a coverage hole detection apparatus and method of the present invention will be explained with reference to example embodiments thereof. However, these example embodiments are not intended to limit the present invention to any specific examples, embodiments, environment, applications, or particular implementations described in these example embodiments. Therefore, description of these example embodiments is only for purpose of illustration rather than to limit the present invention. It should be appreciated that elements unrelated to the present invention are omitted from depiction in the following embodiments and the attached drawings.

Figure 1A:
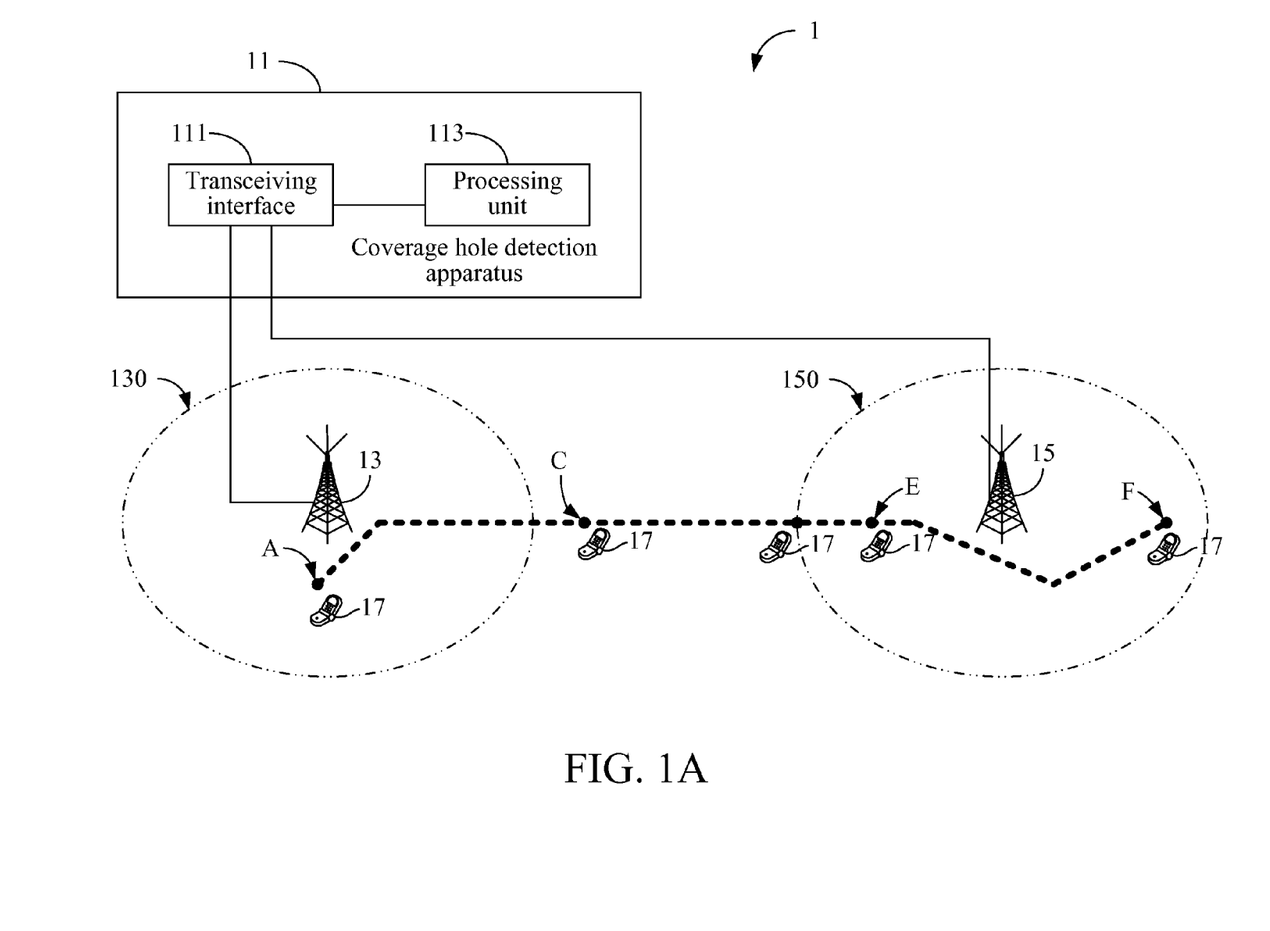
FIG. 1A is a schematic view illustrating an architecture of a wireless network system 1 of a first embodiment.

A first embodiment of the present invention is a wireless network system 1 and a schematic view of an architecture of the wireless network system 1 is shown in FIG. 1A. The wireless network system 1 comprises a coverage hole detection apparatus 11, two base stations 13, 15, and a UE 17. The base station 13 has a signal coverage 130, while the base station 15 has a signal coverage 150. It shall be appreciated that the present invention does not limit the number of base stations that can be comprised in a wireless network system. The present invention does not limit the number of UEs that can be served by one base station as well. Moreover, a person having ordinary skill in the art shall appreciate that the UE may be any mobile apparatus capable of communicating with a base station.

The coverage hole detection apparatus 11 comprises a transceiving interface 111 and a processing unit 113, wherein the transceiving interface 111 is electrically connected to the processing unit 113. The processing unit 113 may be any of various processors, central processing units (CPUs), microprocessors, or other computing devices well known to those of ordinary skill in the art. The transceiving interface 111 may be any interface capable of establishing a communication connection with a base station. In this embodiment, the coverage hole detection apparatus 11 is a server, so the transceiving interface 111 connects to the base stations 13, 15 in a wired way (e.g., through twisted pair cables, optical cables, or co-axial electrical cables). In other embodiments, the coverage hole detection apparatus 11 may be a base station and the transceiving interface 11 may connect to the base stations either in a wired or wireless way (e.g., through antennas of the base stations).

In this embodiment, the UE 17 is moved from a location A to a location F along a movement path as shown by a thick solid line in FIG. 1A. It shall be appreciated that the movement path shown in FIG. 1A is only for purpose of illustration and is not to limit the scope of the present invention. A Radio Link Failure (RLF) happens during the process of moving the UE 17 from the location A to the location F. The coverage hole detection apparatus 11 will use information related to the RLF to detect a coverage hole.

Figure 1B:
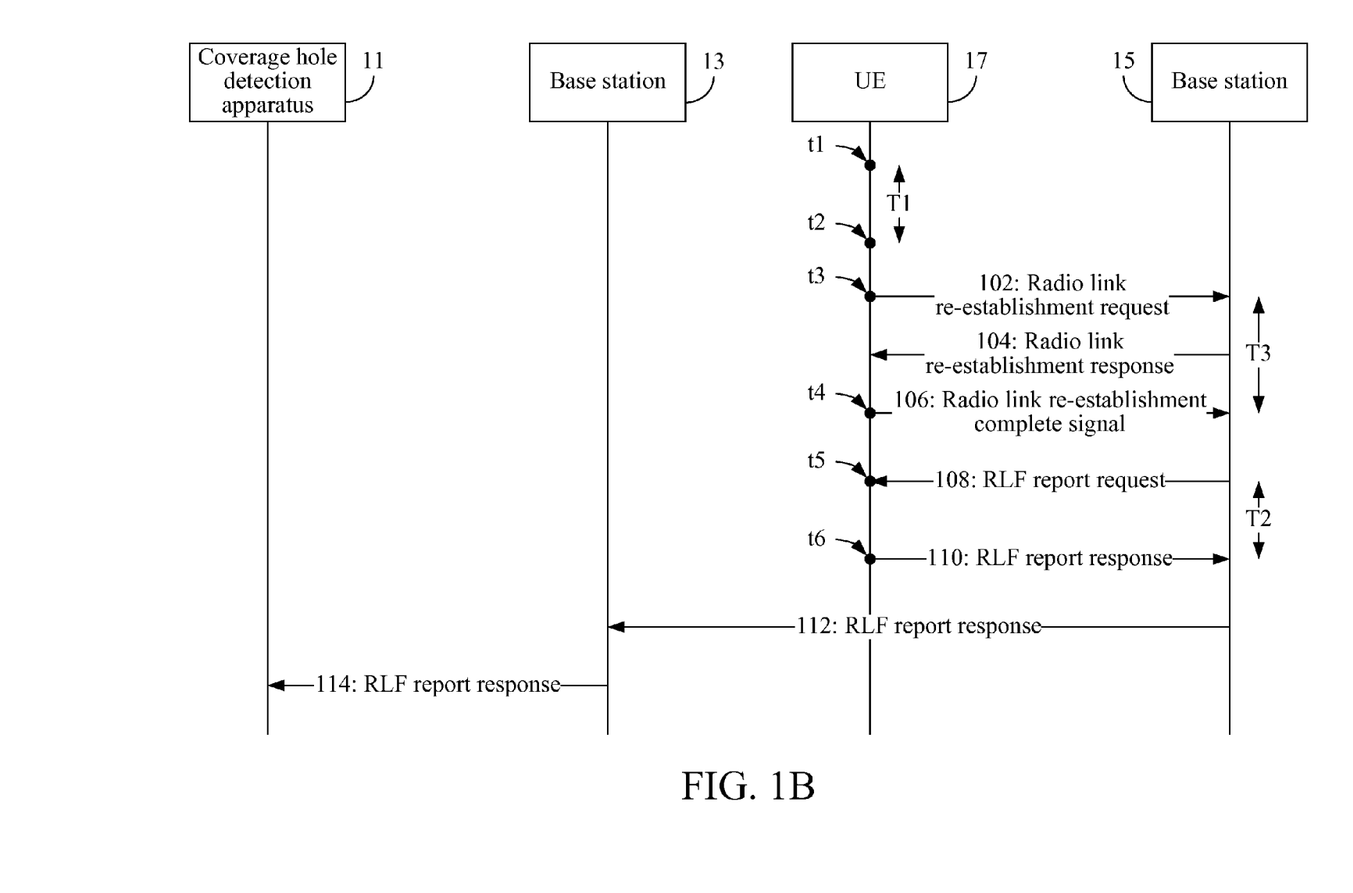
FIG. 1B is a schematic view illustrating signal transmissions between a coverage hole detection apparatus 11, a base station 13, a base station 15, and a UE 17.

Please refer to FIG. 1B as well, which is a schematic view illustrating signal transmissions between the coverage hole detection apparatus 11, the base stations 13, 15, and the UE 17 during the process of moving the UE 17 from the location A to the location F.

The signal strength of a base station attenuates as the distance increases. Therefore, a disconnection from the base station 13 will happen when the UE 17 is moved to a boundary of the signal coverage 130 of the base station 13. In this embodiment, the UE 17 detects a disconnection with the base station 13 (i.e., the UE 17 cannot connect to the base station 13 anymore) at a time point t1, so the UE 17 activates a first timer. At a time point t2 (i.e. the time point right after the time has elapsed for a first preset time length), the UE 17 detects that it is still disconnected from the base station 13. Since the UE 17 has been disconnected from the base station 13 for the first preset time length, the UE 17 determines that an RLF has happened. When the UE 17 determines that an RLF has happened (i.e., at the time point t2), the UE 17 stops the first timer and records a piece of first location information (i.e., the location C shown in FIG. 1A) where the UE 17 is located at this time point (i.e., at the time point when it is determined that an RLF has happened). Based on the aforesaid operations made by the UE 17 on the first timer, the first timer records a time length T1 from the time point when the UE 17 detects a disconnection from the base station 13 to the time point when the UE 17 determines that an RLF has happened.

Since the UE 17 has determined that an RLF has happened, the UE 17 searches for other base stations that it can connect to. In this embodiment, the base station 15 is found by the UE 17 through searching at a time point t3, so the UE 17 performs a radio link re-establishment procedure with the base station 15. Specifically, the UE 17 transmits a radio link re-establishment request 102 to the base station 15, the base station 15 transmits a radio link re-establishment response 104 to the UE 17 in response. In response to the radio link re-establishment response 104, the UE 17 transmits a radio link re-establishment complete signal 106 to the base station 15. Through the 3-way handshakes, the radio link re-establishment procedure can be completed between the UE 17 and the base station 15.

Tue UE 17 receives an RLF report request 108 transmitted by the base station 15 at a time point t5, so the UE 17 activates a second timer. The purpose of transmitting the RLF report request 108 by the base station 15 is to request for RLF related information from the UE 17. At a time point t6, the UE 17 has prepared the RLF related information (e.g., an identity of a previous base station (i.e., the base station 13) of the UE 17, an identity of a neighboring base station of the previous base station, location information of the previous base station, etc) for the base station 15, so the UE 17 records a piece of second location information about the location (i.e., the location E shown in FIG. 1A) where it is located at the time point 6, transmits an RLF report response 110 to the base station 15, and stops the second timer.

It shall be appreciated that the time point t6 may also be treated as a time point when the RLF report response 110 is transmitted by the UE 17 and the piece of second location information may be viewed as a location where the RLF report response 110 is transmitted by the UE 17. Additionally, based on the aforesaid operations on the second timer by the UE 17, the second timer records a time length T2 from the time point when the RLF report request 108 is received by the UE 17 to the time point when the RLF report response 110 is transmitted by the UE 17 to the base station 15. Furthermore, the RLF report response 110 carries the RLF related information, the piece of first location information (i.e., the location C shown in FIG. 1A), the piece of second location information (i.e., the location E shown in FIG. 1A), the time length T1, and the time length T2.

Afterwards, the base station 15 transmits an RLF report response 112 to the base station 13. Similarly, the RLF report response 112 carries the RLF related information, the piece of first location information (i.e., the location C shown in FIG. 1A), the piece of second location information (i.e., the location E shown in FIG. 1A), the time length T1, and the time length T2. Next, the base station 13 transmits an RLF report response 114 to the coverage hole detection apparatus 11. Similarly, the RLF report response 114 carries the RLF related information, the piece of first location information (i.e., the location C shown in FIG. 1A), the piece of second location information (i.e., the location E shown in FIG. 1A), the time length T1, and the time length T2.

In this embodiment, each of the UE 17, the base station 13, and the base station 15 integrates the RLF related information, the piece of first location information, the piece of second location information, the time length T1, and the time length T2 into one single signal (i.e., the RLF report responses 110, 112, 114) for transmission. However, it is noted that the UE 17 may transmit the RLF related information, the piece of first location information, the piece of second location information, the time length T1, and the time length T2 individually in other embodiments and so do the base station 15 and the base station 13.

From the viewpoint of the coverage hole detection apparatus 11, the transceiving interface 111 receives the piece of first location information (i.e., the location C), the piece of second location information (i.e., the location E), the time length T1, and the time length T2 from the base station 13. Please refer to FIG. 1C as well, which is a schematic view illustrating how the coverage hole detection apparatus 11 decides a coverage hole 170. The processing unit 113 calculates a first distance D1 according to the time length T1 (i.e., the time length from a time point when the UE 17 has detected a disconnection from the base station 13 to a time point when the UE 17 determines that an RLF has happened) and a moving velocity. Furthermore, the processing unit 113 calculates a second distance D2 according to the time length T2 (i.e., a time length from a time point when the UE 17 receives the RLF report request 108 to a time point when the UE 17 transmits the RLF report response 110 to the base station 15) and a moving velocity. It shall be appreciated that the moving velocity may be a preset value, an average moving velocity of general UEs, a history average moving velocity of the UE 17, or some other similar values.

Figure 1C:
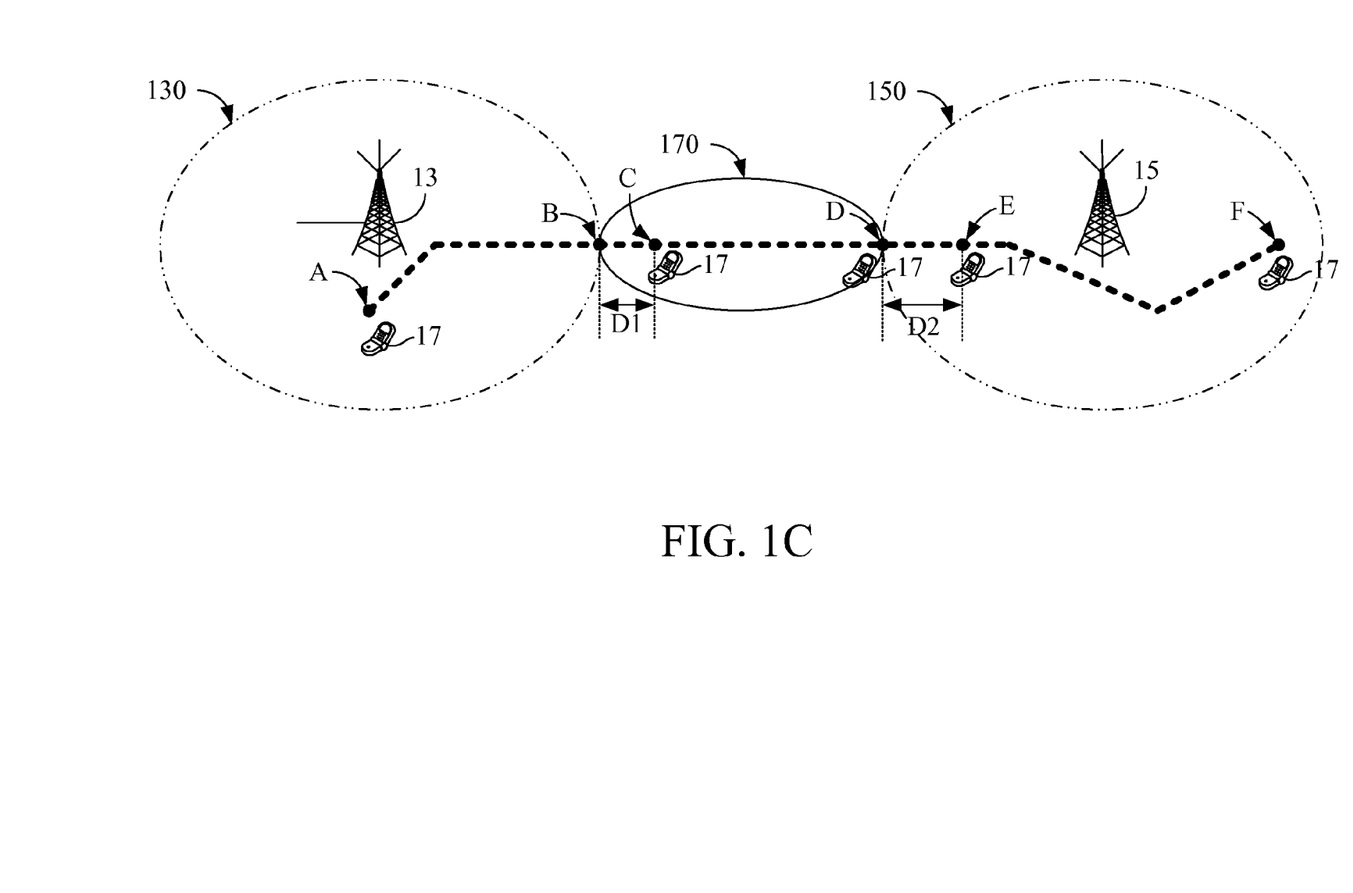
FIG. 1C is a schematic view illustrating how the coverage hole detection apparatus 11 decides a coverage hole 170.

Afterwards, the processing unit 113 decides a first boundary location (i.e., the location B) of the coverage hole 170 according to the piece of first location information (i.e., the location C) and the first distance D1. Specifically, the processing unit 113 takes the piece of first location information (i.e., the location C1) as a start point and calculates a location (i.e., the location B) having a distance D1 backward from the start point on the movement path of the UE 17 and the processing unit 113 takes this location as the first boundary location. In other words, the processing unit 113 calculates the first boundary location as the location where the UE 17 begins to detect a disconnection from the base station 13 according to the piece of first location information (i.e., the location C) and the first distance D1.

Moreover, the processing unit 113 decides a second boundary location (i.e., the location D) of the coverage hole 170 according to the piece of second location information (i.e., the location E) and the second distance D2. Specifically, the processing unit 113 takes the piece of second location information (i.e., the location E) as a start point and calculates a location (i.e., the location D) having a distance D2 backward from the start point on the movement path of the UE 17 and the processing unit 113 takes this location as the second boundary location. In other words, the processing unit 113 calculates a location where the UE 17 finds the base station 15 through searching according to the piece of second location information (i.e., the location E) and the second distance D2.

Thereafter, the processing unit 113 decides a coverage hole 170 according to the first boundary location (i.e., the location B), the second boundary location (i.e., the location D), and a sensitivity range (not shown) of the UE 17. Briefly speaking, the coverage hole detection apparatus 11 decides the coverage hole 170 according to the location where the UE 17 begins to detect a disconnection from the base station 13, the location where the UE 17 finds the base station 15 through searching, and the sensitivity range of the UE 17.

Figure 1D:
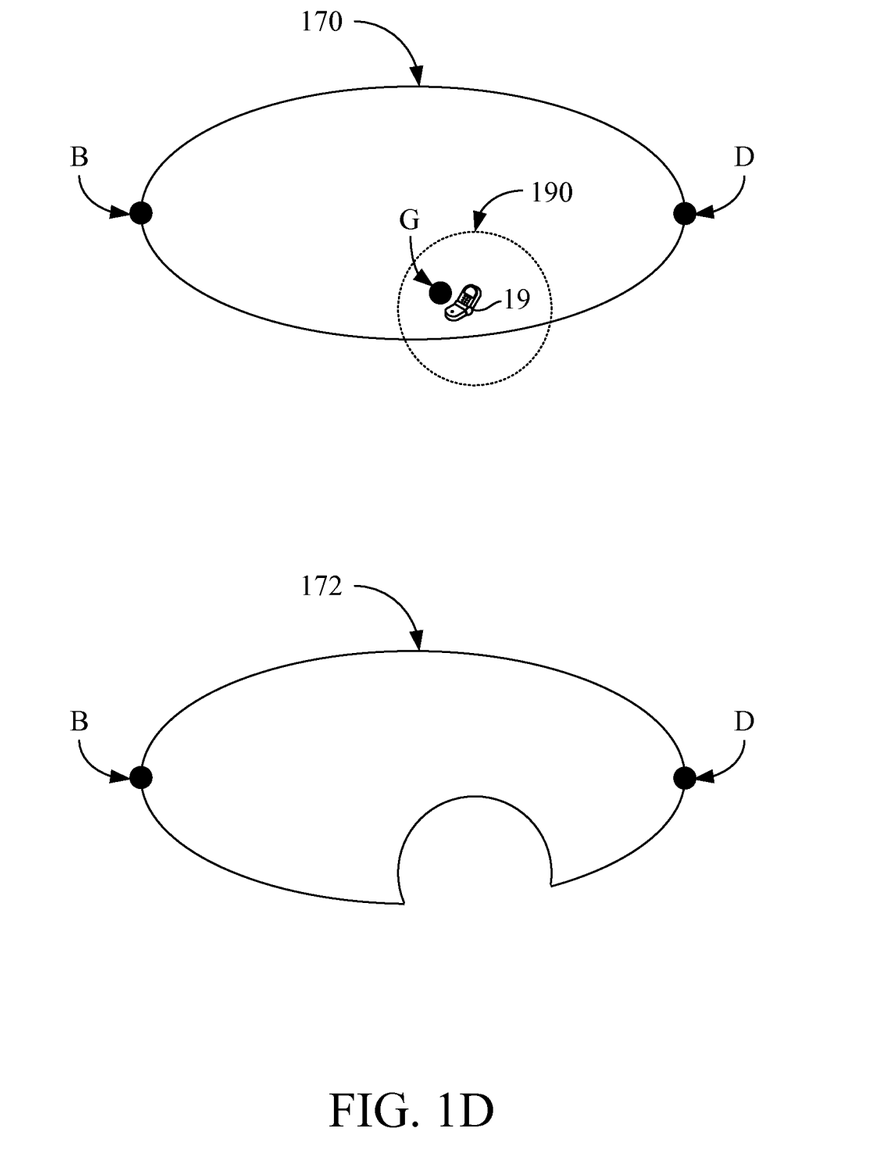
FIG. 1D is a schematic view illustrating updating the coverage hole 170 by the effective range.

In some embodiments, the transceiving interface 111 of the coverage hole detection apparatus 11 also receives an effective location(s) transmitted by the UE 17 and/or other UEs. The transceiving interface 111 may receive the effective location(s) via the base station 13 and/or the base station 15. An effective location refers to a location where an UE is able to receive signals transmitted by the base station 13 and/or the base station 15. For an effective location, an effective range may be decided by the processing unit 113 according to the effective location and a sensitivity range of the UE that transmits the effective location. The processing unit 113 then updates the coverage hole 170 by the effective range. Here, a concrete example will be described with reference to FIG. 1D. The transceiving interface 111 receives an effective location G transmitted by a UE 19 directly or via a base station. The processing unit 113 decides an effective range 190 according to the effective location G and the sensitivity range of the UE 19. Then, the processing unit 113 calculates an overlapped area between the coverage hole 170 and the effective range 190. The processing unit 113 updates the coverage hole 172 by deducting the overlapped area from the coverage hole 170.

In some embodiments, the coverage hole detection apparatus 11 may further refer to other time information (i.e., the time length from the time point when the UE 17 finds the base station 15 through searching to the time point when the UE 17 completes the radio link re-establishment procedure with the base station 15) to prevent from using erroneous information to calculate the coverage hole. Here, how this time information is obtained by the coverage hole detection apparatus 11 will be further described with reference to FIG. 1A. When the base station 15 is found through searching by the UE 17 at the time point t3, the UE 17 activates a third timer. When the UE 17 transmits a radio link re-establishment complete signal 106 to the base station 15 at the time point t4, the UE 17 stops the third timer. Based on the aforesaid operations on the third timer by the UE 17, the third timer records a time length T3 from the time point when the base station 15 is found through searching by the UE 17 to the time point when the UE 17 completes the radio link re-establishment procedure with the base station 15. In these embodiments, the time length T3 is transmitted to the coverage hole detection apparatus 11, e.g., by being carried in the RLF report response 110, 112, 114. In these embodiments, after the time length T1, the time length T2, and the time length T3 are received by the transceiving interface 111, the processing unit 113 determines whether a sum of the time length T1, the time length T2, and the time length T3 is smaller than a second preset time length. If the sum of the time length T1, the time length T2, and the time length T3 is not smaller than the second preset time length, it means that it is very likely that the UE 17 stays at a location having a poor signal strength for a long time and, hence, the processing unit 113 will not decide the coverage hole according to related information collected from this RLF. The processing unit 113 decides the coverage hole 170 through the aforesaid operations according to the piece of first location information, the piece of second location information, the time length T1, and the time length T2 only when the sum of the time length T1, the time length T2, and the time length T3 is smaller than the second preset time length.

In some embodiments, the coverage hole detection apparatus 11 may further make reference to other geographic information to prevent from using erroneous information to calculate the coverage hole. Specifically, the processing unit 113 may calculate a third distance (not shown) according to the piece of first location information (i.e., the location where the UE 17 determines that an RLF has happened—the location C) and the piece of second location information (i.e., the location where the UE 17 transmits the RLF report response 110—the location E). The processing unit 113 determines whether the third distance is smaller than a coverage radius of a base station (e.g., the base station 13). If the third distance is not smaller than the coverage radius of the base station, it means that it is very likely that the UE 17 rapidly presents in a signal coverage of another non-neighboring base station (e.g., in a flying airplane) and, hence, the processing unit will not decide the coverage hole according to related information collected from this RLF. The processing unit 113 decides the coverage hole 170 through the aforesaid operations according to the piece of first location information, the piece of second location information, the time length T1, and the time length T2 only when the third distance is smaller than a coverage radius of a base station.

In other embodiments, the transceiving interface 111 of the coverage hole detection apparatus 11 may further receive a Reference Signal Receiving Power (RSRP) and a Received Signal Strength Indicator (RSSI) that is transmitted by the UE 17 directly or via a base station. In these embodiments, the processing unit 113 decides the coverage hole 170 through the aforesaid operations according to the piece of first location information, the piece of second location information, the time length T1, and the time length T2 only when it is determined that the RSRP of the UE 17 is smaller than a first threshold and that the UE 17 does not perform a handover procedure. Additionally, the processing unit 113 decides a type of the coverage hole 170 according to the RSSI of the UE 17 and a second threshold. Specifically, the processing unit 113 decides the coverage hole 170 to be a coverage hole caused by interferences when the RSSI of the UE 17 is larger than the second threshold and to be a general coverage hole when the RSSI of the UE 17 is not larger than the second threshold.

According to the above descriptions, the first time length (i.e., a time length from a time point when the UE 17 has detected a disconnection from the base station 13 to a time point when the UE 17 determines that an RLF has happened) and the piece of first location information (i.e., the location where the UE 17 determines that the RLF has happened) are used to calculate a first boundary location (i.e., a location where the UE 17 has detected the disconnection between the UE 17 and the base station 13). Further, the second time length (i.e., a time length from a time point when the UE 17 receives an RLF report request 108 from the base station 15 to a time point when the UE 17 transmits an RLF report response 110 to the base station 15) and a piece of second location information (i.e., a location where the UE 17 transmits the RLF report response 110) are used to calculate a second boundary location (i.e., a location where the base station 15 is detected by the UE 17). Then, a coverage hole 170 is decided by the coverage hole detection apparatus 11 according to the first boundary location, the second boundary location, and a sensitivity range of the UE 17. Since the first boundary location corresponds to the location where the UE 17 has detected a disconnection between the UE 17 and the base station 13 and the second boundary location corresponds to the location where the base station 15 is detected by the UE 17, the coverage hole 170 decided according to these two boundary locations and the sensitivity range of the UE 17 is surely an area where it is impossible or difficult for the UE 17 to be served by a base station. Furthermore, the reference time information and the geographic information may also be used by the coverage hole detection apparatus 11 to derive the coverage hole 170 more correctly.

Figure 2:
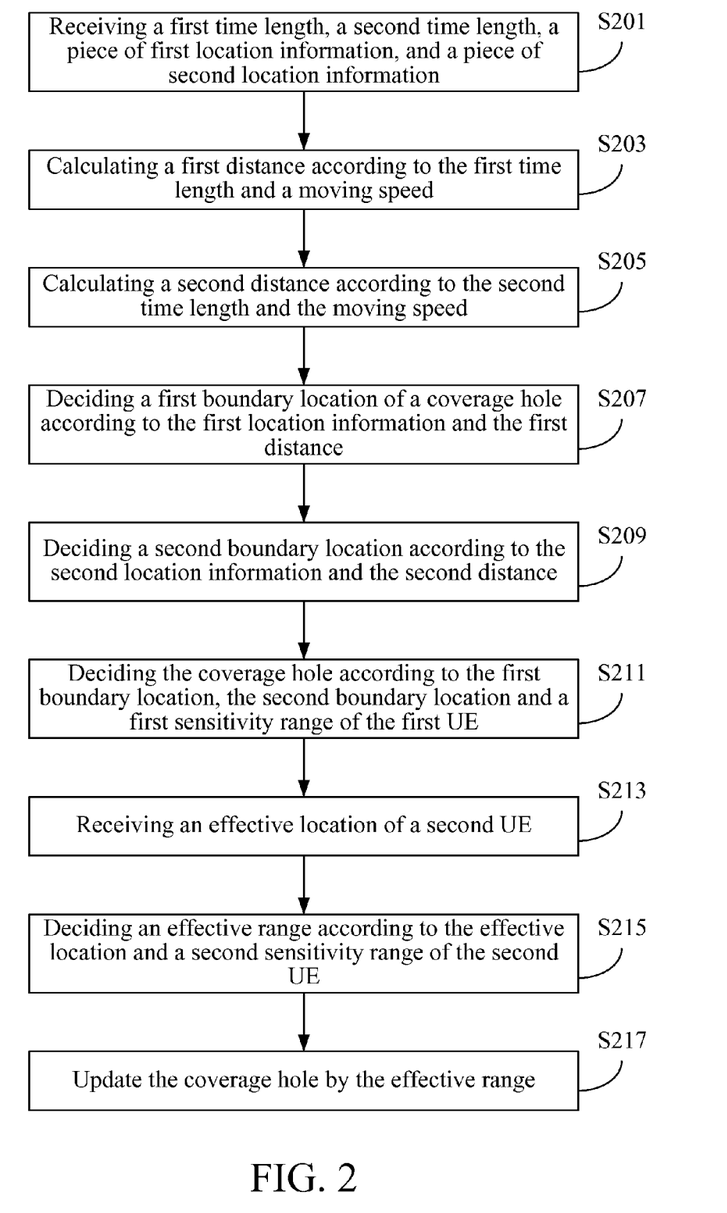
FIG. 2 is a flowchart diagram of a second embodiment.

A second embodiment of the present invention is a coverage hole detection method and a flowchart diagram of which is shown in FIG. 2. The coverage hole detection method is for use in an electronic apparatus, e.g., the coverage hole detection apparatus 11 described in the first embodiment.

First, step S201 is executed to receive a first time length, a second time length, a piece of first location information, and a piece of second location information by the electronic apparatus. The first time length is from a time point when a first UE has detected a disconnection from a first base station to a time point when the first UE determines that an RLF has happened. The second time length is from a time point when the first UE receives an RLF report request from a second base station to a time point when the first UE transmits an RLF report response to the second base station. The piece of first location information indicates a location where the first UE determines that the RLF has happened. The piece of second location information indicates a location where the first UE transmits the RLF report response.

Then, step S203 is executed to calculate a first distance according to the first time length and a moving velocity by the electronic apparatus. Step S205 is executed to calculate a second distance according to the second time length and the moving velocity by the electronic apparatus. Step S207 is executed to decide a first boundary location of a coverage hole by the electronic apparatus according to the piece of first location information and the first distance. Step S209 is executed to decide a second boundary location by the electronic apparatus according to the piece of second location information and the second distance. It shall be appreciated that the steps S203, S205, S207 and S209 may be executed in other orders in other embodiments as long as the step S203 is executed earlier than the step S207 and the step S205 is executed earlier than the step S209. Afterwards, step S211 is executed to decide the coverage hole by the electronic apparatus according to the first boundary location, the second boundary location, and a first sensitivity range of the first UE.

In some embodiments, the coverage hole detection method may further execute step S213 for receiving an effective location of a second UE by the electronic apparatus, execute step S215 for deciding an effective range according to the effective location and a second sensitivity range of the second UE by the electronic apparatus, and execute step S217 for updating the coverage hole by the effective range by the electronic apparatus.

In some embodiments, before executing the aforesaid steps S201 to S217, the coverage hole detection method may further execute a step for determining that an RSRP of the first UE is smaller than a first threshold by the electronic apparatus and another step for determining that the first UE does not perform a handover procedure by the electronic apparatus. In some embodiments, the coverage hole detection method may further execute a step for deciding a type of the coverage hole according to an RSSI of the first UE and a second threshold by the electronic apparatus.

In addition to the aforesaid steps, the second embodiment can also execute all the operations and steps of the first embodiment, have the same functions, and deliver the same technical effect as the first embodiment. How the second embodiment executes these operations and steps of the first embodiment, have the same functions, and deliver the same technical effect as the first embodiment will be readily appreciated by those of ordinary skill in the art based on the explanation of the first embodiment, and thus will not be further described herein.

Figure 3:
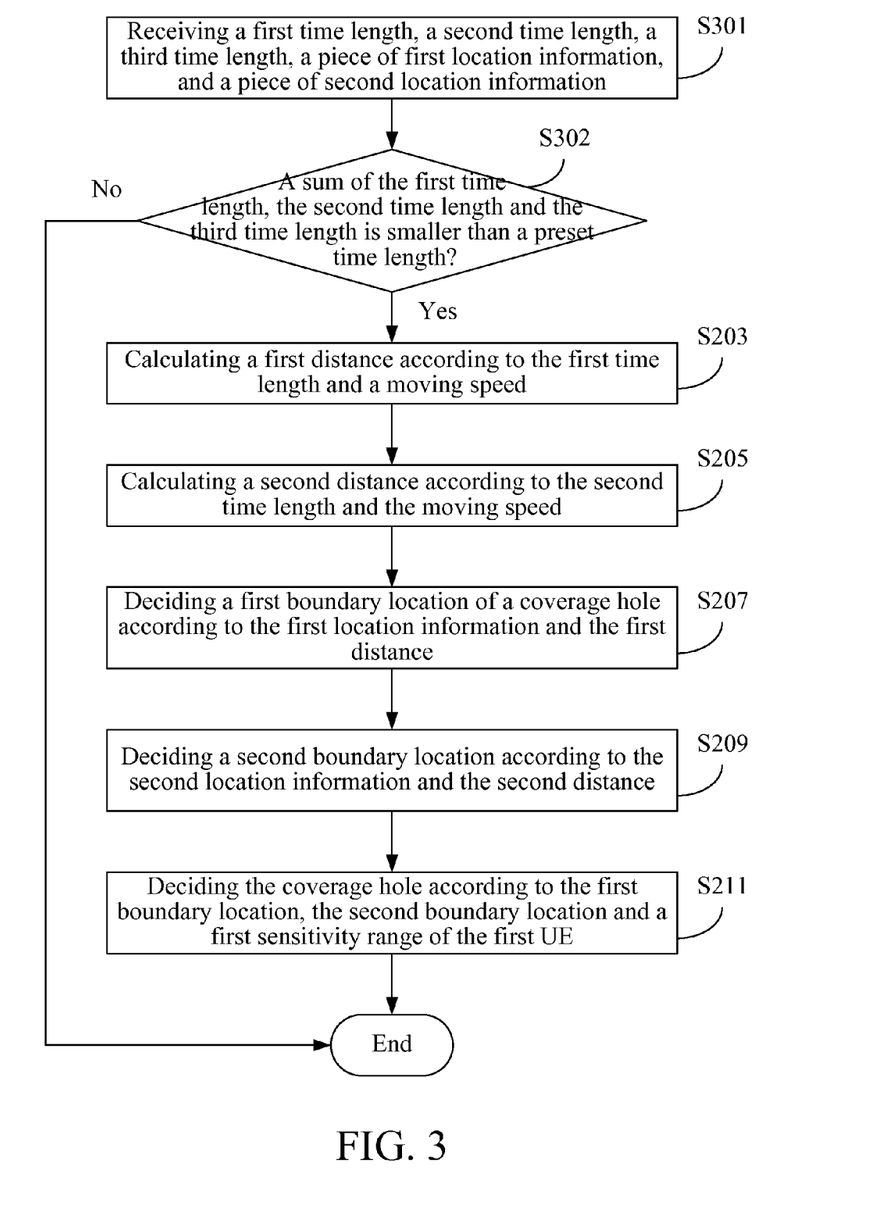
FIG. 3 is a flowchart diagram of a third embodiment.

A third embodiment of the present invention is a coverage hole detection method and a flowchart diagram of which is shown in FIG. 3. The coverage hole detection method is for use in an electronic apparatus, e.g., the coverage hole detection apparatus 11 described in the first embodiment.

Firstly, step S301 is executed to receive a first time length, a second time length, a third time length, a piece of first location information, and a piece of second location information by the electronic apparatus. The first time length is from a time point when a first UE has detected a disconnection from a first base station to a time point when the first UE determines that an RLF has happened. The second time length is from a time point when the first UE receives an RLF report request from a second base station to a time point when the first UE transmits an RLF report response to the second base station. The third time length is from a time point when the first UE has found the second base station through searching to a time point when the first UE has completed a radio link re-establishment procedure with the second base station. The first piece of location information indicates a location where the first UE determines that the RLF has happened. The piece of second location information indicates a location where the first UE transmits the RLF report response.

Then, step S302 is executed by the electronic apparatus to determine whether a sum of the first time length, the second time length, and the third time length is smaller than a preset time length. If the step S302 determines that the sum of the first time length, the second time length, and the third time length is smaller than a preset time length, the coverage hole detection method then continues to execute the steps S203 to S211. If the step S302 determines that the sum of the first time length, the second time length, and the third time length is not smaller than a preset time length, the coverage hole detection method is ended directly.

In addition to the aforesaid steps, the third embodiment can also execute all the operations and steps of the first and the second embodiments, have the same functions, and deliver the same technical effect as the first and the second embodiments. How the third embodiment executes these operations and steps of the first and the second embodiments, have the same functions, and deliver the same technical effect as the first and the second embodiments will be readily appreciated by those of ordinary skill in the art based on the explanation of the first and the second embodiments, and thus will not be further described herein.

Figure 4:
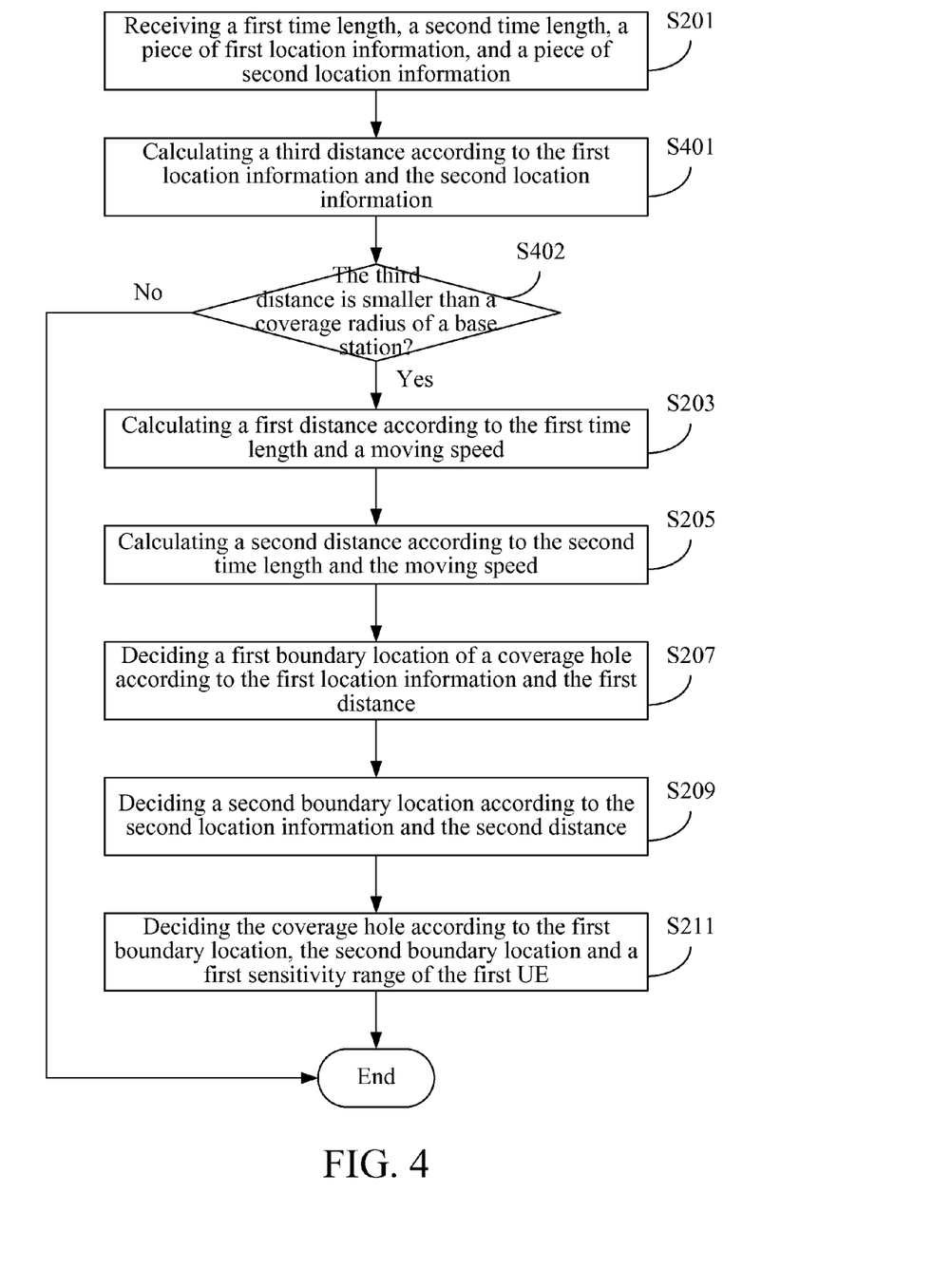
FIG. 4 is a flowchart diagram of a fourth embodiment.

A fourth embodiment of the present invention is a coverage hole detection method and a flowchart diagram of which is shown in FIG. 4. The coverage hole detection method is for use in an electronic apparatus, e.g., the coverage hole detection apparatus 11 described in the first embodiment.

Firstly, step S201 is executed to receive a first time length, a second time length, a piece of first location information, and a piece of second location information by the electronic apparatus. The first time length is from a time point when a first UE has detected a disconnection from a first base station to a time point when the first UE determines that an RLF has happened. The second time length is from a time point when the first UE receives an RLF report request from a second base station to a time point when the first UE transmits an RLF report response to the second base station. The piece of first location information indicates a location where the first UE determines that the RLF has happened. The piece of second location information indicates a location where the first UE transmits the RLF report response.

Then, step S401 is executed by the electronic apparatus to calculate a third distance according to the first piece of location information and the piece of second location information. Then, step S402 is executed by the electronic apparatus to determine whether the third distance is smaller than a coverage radius of a base station (e.g., the first base station). If the step S402 determines that the third distance is smaller than the coverage radius, the coverage hole detection method continues to execute the steps S203 to S211. If the step S402 determines that the third distance is not smaller than the coverage radius, the coverage hole detection method is ended directly.

In addition to the aforesaid steps, the fourth embodiment can also execute all the operations and steps of the first to the third embodiments, have the same functions, and deliver the same technical effect as the first to the third embodiments. How the fourth embodiment executes these operations and steps of the first to the third embodiments, have the same functions, and deliver the same technical effect as the first to the third embodiments will be readily appreciated by those of ordinary skill in the art based on the explanation of the first to the third embodiments, and thus will not be further described herein.

It shall be appreciated that the terms "first" and "second" used in "the first preset time length" and "the second preset time length" are used only to distinguish these different preset time lengths in the specification and the claims of the present invention. Likewise, the terms "first," "second," and "third" used in "the first distance," "the second distance," and "the third distance" are used only to distinguish these different distances. The terms "first" and "second" used in "the first boundary location" and "the second boundary location" are used only to distinguish the different boundary locations. The terms "first" and "second" used in "the piece of first location information" and "the piece of second location information" are used only to distinguish the different pieces of location information. The terms "first" and "second" used in "the first threshold" and "the second threshold" are used only to distinguish these different thresholds.

According to the description of the aforesaid embodiments, a first time length (i.e., a time length from a time point when a UE has detected a disconnection from a first base station to a time point when the UE determines that an RLF has happened) and a piece of first location information (i.e., the location where the UE determines that the RLF has happened) are used to calculate a first boundary location (i.e., a location where the UE has detected the disconnection between the UE and the first base station). Moreover, a second time length (i.e., a time length from a time point when the UE receives an RLF report request from a second base station to a time point when the UE transmits an RLF report response to the second base station) and a piece of second location information (i.e., a location where the UE transmits the RLF report response) are used to calculate a second boundary location (i.e., a location where the second base station is detected by the UE). Then, a coverage hole is decided according to the first boundary location, the second boundary location, and a sensitivity range of the UE.

Since the first boundary location corresponds to the location where the UE has detected a disconnection between the UE and the first base station and the second boundary location corresponds to the location where the second base station is detected by the UE, the coverage hole decided according to these two boundary locations and the sensitivity range of the UE is surely an area where it is impossible or difficult for the UE to be served by a base station. Additionally, the reference time information and the geographic information may also be used to derive the coverage hole more correctly.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A coverage hole detection apparatus, comprising:
   a transceiver interface, being configured to receive a first time length, a second time length, a piece of first location information, and a piece of second location information, wherein the first time length is from a time point when a first user equipment (UE) has detected a disconnection from a first base station to a time point when the first UE determines that a Radio Link Failure (RLF) has happened, the second time length is from a time point when the first UE receives an RLF report request from a second base station to a time point when the first UE transmits an RLF report response to the second base station, the piece of first location information indicates a location where the first UE determines that the RLF has happened, and the piece of second location information indicates a location where the first UE transmits the RLF report response; and
   a processing unit, being electrically connected to the transceiving interface and configured to calculate a first distance according to the first time length and a moving velocity, calculate a second distance according to the second time length and the moving velocity, decide a first boundary location of a coverage hole according to the piece of first location information and the first distance, decides a second boundary location according to the piece of second location information and the second distance, and decide the coverage hole according to the first boundary location, the second boundary location, and a first sensitivity range of the first UE.

2. The coverage hole detection apparatus of claim 1, wherein the transceiving interface further receives an effective location of a second UE, the processing unit further decides an effective range according to the effective location and a second sensitivity range of the second UE, and the processing unit further updates the coverage hole by the effective range.

3. The coverage hole detection apparatus of claim 1, wherein the transceiving interface further receives a third time length, the third time length is from a time point when the first UE has found the second base station through searching to a time point when the first UE has completed a radio link re-establishment procedure with the second base station, and the processing unit further determines that a sum of the first time length, the second time length, and the third time length is smaller than a preset time length.

4. The coverage hole detection apparatus of claim 1, wherein the first base station has a coverage radius, the processing unit further calculates a third distance according to the piece of first location information and the piece of second location information, and the processing unit further determines that the third distance is smaller than the coverage radius.

5. The coverage hole detection apparatus of claim 1, wherein the processing unit further determines that a Reference Signal Receiving Power (RSRP) of the first UE is smaller than a first threshold and determines that the first UE does not perform a handover procedure.

6. The coverage hole detection apparatus of claim 5, wherein the processing unit further decides a type of the coverage hole according to a Received Signal Strength Indicator (RSSI) of the first UE and a second threshold.

7. A coverage hole detection method for use in an electronic apparatus, comprising:
   receiving a first time length, a second time length, a piece of first location information, and a piece of second location information, wherein the first time length is from a time point when a first UE has detected a disconnection from a first base station to a time point when the first UE determines that an RLF has happened, the second time length is from a time point when the first UE receives an RLF report request from a second base station to a time point when the first UE transmits an RLF report response to the second base station, the piece of first location information indicates a location where the first UE determines that the RLF has happened, and the piece of second location information indicates a location where the first UE transmits the RLF report response;
   calculating a first distance according to the first time length and a moving velocity;
   calculating a second distance according to the second time length and the moving velocity;
   deciding a first boundary location of a coverage hole according to the piece of first location information and the first distance;
   deciding a second boundary location according to the piece of second location information and the second distance; and deciding the coverage hole according to the first boundary location, the second boundary location and a first sensitivity range of the first UE.

8. The coverage hole detection method of claim 7, further comprising:
receiving an effective location of a second UE;
deciding an effective range according to the effective location and a second sensitivity range of the second UE; and
updating the coverage hole by the effective range.

9. The coverage hole detection method of claim 7, further comprising:
receiving a third time length, wherein the third time length is from a time point when the first UE has found the second base station through searching to a time point when the first UE has completed a radio link re-establishment procedure with the second base station; and
determining that a sum of the first time length, the second time length, and the third time length is smaller than a preset time length.

10. The coverage hole detection method of claim 7, wherein the first base station has a coverage radius, the coverage hole detection method further comprises:
calculating a third distance according to the piece of first location information and the piece of second location information; and
determining that the third distance is smaller than the coverage radius.

11. The coverage hole detection method of claim 7, further comprising:
determining that an RSRP of the first UE is smaller than a first threshold; and
determining that the first UE does not perform a handover procedure.

12. The coverage hole detection method of claim 11, further comprising:
deciding a type of the coverage hole according to an RSSI of the first UE and a second threshold.

\* \* \* \* \*